United States Patent
Goldyn et al.

(10) Patent No.: US 10,981,602 B2
(45) Date of Patent: Apr. 20, 2021

(54) PRESS-HARDENED SHAPED METAL SHEET HAVING DIFFERENT SHEET THICKNESSES AND STRENGTHS

(71) Applicant: Bayerische Motoren Werke Aktiengesellschaft, Munich (DE)

(72) Inventors: Lukasz Goldyn, Munich (DE); Markus Pfestorf, Neufahrn (DE); Martin Kerscher, Dornwang (DE); Daniel Augustin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 294 days.

(21) Appl. No.: 15/681,788

(22) Filed: Aug. 21, 2017

(65) Prior Publication Data
US 2017/0341684 A1    Nov. 30, 2017

Related U.S. Application Data

(63) Continuation of application No. PCT/EP2016/053110, filed on Feb. 15, 2016.

(30) Foreign Application Priority Data

Mar. 2, 2015    (DE) ..................... 10 2015 203 644.8

(51) Int. Cl.
*B62D 25/04*    (2006.01)
*B21D 22/02*    (2006.01)
(Continued)

(52) U.S. Cl.
CPC ............ *B62D 25/04* (2013.01); *B21D 22/022* (2013.01); *B21D 53/88* (2013.01); *C21D 1/673* (2013.01); *C21D 2221/00* (2013.01)

(58) Field of Classification Search
None
See application file for complete search history.

(56) References Cited

U.S. PATENT DOCUMENTS

| | | |
|---|---|---|
| 5,916,389 A | 6/1999 | Lundstrom |
| 5,924,316 A | 7/1999 | Streubel et al. |
| (Continued) | | |

FOREIGN PATENT DOCUMENTS

| | | |
|---|---|---|
| CN | 203255254 U | 10/2013 |
| CN | 103429485 A | 12/2013 |
| (Continued) | | |

OTHER PUBLICATIONS

Translation of Section 5 of Xu Z. "Lightweight Optimization of B Pillar Based on the Side Impact and the New Type Blanks", Master Disseration, Dalian Univeristy of Techonology, 2012, Section 5 [Orginal submitted IDS Dec. 20, 2019]. (Year: 2012).*

(Continued)

*Primary Examiner* — David Sample
*Assistant Examiner* — Elizabeth Collister
(74) *Attorney, Agent, or Firm* — Crowell & Moring LLP

(57) ABSTRACT

A press-hardened shaped metal sheet has at least two adjacent zones having different sheet thicknesses and different strengths such that one of the zones is press-hardened and the other zone is non-hardened or only slightly hardened. A transition zone, which is simultaneously designed as a thickness transition zone and as a strength transition zone, is located between the zones. The press-hardened shaped metal sheet is preferably a pillar reinforcement for a motor vehicle body.

17 Claims, 1 Drawing Sheet

(51) Int. Cl.
*C21D 1/673* (2006.01)
*B21D 53/88* (2006.01)

(56) References Cited

U.S. PATENT DOCUMENTS

| | | |
|---|---|---|
| 2008/0211264 A1 | 9/2008 | Riess et al. |
| 2011/0175401 A1 | 7/2011 | Fujimura |
| 2011/0233946 A1 | 9/2011 | Pellmann et al. |
| 2012/0006089 A1 | 1/2012 | Pohl et al. |
| 2012/0040205 A1 | 2/2012 | Lenze et al. |
| 2012/0091758 A1* | 4/2012 | Zimmermann ........ B62D 25/08 296/193.06 |
| 2013/0076075 A1 | 3/2013 | Pohl et al. |
| 2014/0008938 A1 | 1/2014 | Busch et al. |
| 2014/0191536 A1 | 7/2014 | Elfwing et al. |
| 2015/0082636 A1* | 3/2015 | Gruneklee ............ B21D 22/02 29/897.2 |
| 2015/0091327 A1 | 4/2015 | Kim |

FOREIGN PATENT DOCUMENTS

| | | |
|---|---|---|
| DE | 10 2005 038 488 A1 | 2/2007 |
| DE | 197 58 918 B4 | 8/2010 |
| DE | 10 2009 003 508 A1 | 9/2010 |
| DE | 10 2010 004 081 B3 | 3/2011 |
| DE | 10 2010 012 825 A1 | 9/2011 |
| DE | 20 2012 000 616 U1 | 4/2012 |
| DE | 10 2011 009 891 A1 | 8/2012 |
| DE | 10 2011 053 939 A1 | 3/2013 |
| DE | 10 2011 113 675 A1 | 3/2013 |
| EP | 0 788 849 A1 | 8/1997 |
| EP | 2 561 946 A1 | 2/2013 |
| EP | 2 754 603 A1 | 7/2014 |
| JP | 2013-86591 A | 5/2013 |
| KR | 10-1491319 B1 | 2/2015 |

OTHER PUBLICATIONS

Zhang et al.; Study on Nonuniform Deformation of Tailor Rolled Blank During Uniaxial Tension; Acta Metall. Sin. (2015), 28(9), pp. 1198-1204. (Year: 2015).*

Merklein et al.; A review on tailored blanks—Production, applications and evaluation; Journal of Materials Processing Technology; (2014); 214(2) pp. 151-164. (Year: 2014).*

Chinese-language Office Action issued in counterpart Chinese Application No. 201680003545.5 dated Aug. 24, 2018 with English translation (13 pages).

German Search Report issued in counterpart German Application No. 10 2015 203 644.8 dated Jan. 13, 2016 with partial English-language translation (eleven (11) pages).

International Search Report (PCT/ISA/210) issued in PCT Application No. PCT/EP2016/053110 dated Apr. 18, 2016 with English-language translation (five (5) pages).

German-language Written Opinion (PCT/ISA/220) issued in PCT Application No. PCT/EP2016/053110 dated Apr. 18, 2016 (four (4) pages).

Chinese-language Office Action issued in counterpart Chinese Application No. 201680003545.5 dated Oct. 18, 2019 with English translation (17 pages).

Xu Z., "Lightweight Optimization of B Pillar Based on the Side Impact and the New Type Blanks", Master Dissertation, Dalian University of Technology, May 1, 2012, pp. 1-72, with English abstract (81 pages).

* cited by examiner

PRESS-HARDENED SHAPED METAL SHEET HAVING DIFFERENT SHEET THICKNESSES AND STRENGTHS

CROSS REFERENCE TO RELATED APPLICATIONS

This application is a continuation of PCT International Application No. PCT/EP2016/053110, filed Feb. 15, 2016, which claims priority under 35 U.S.C. § 119 from German Patent Application No. 10 2015 203 644.8, filed Mar. 2, 2015, the entire disclosures of which are herein expressly incorporated by reference.

BACKGROUND AND SUMMARY OF THE INVENTION

The invention relates to a press-hardened shaped metal sheet having different sheet thicknesses and strengths, preferably for use as a chassis or body component and, in particular, a structural component for a motor vehicle.

Press-hardened shaped metal sheets, which are produced by reshaping or compression-molding a sheet steel material previously heated to austenitizing temperature and substantially simultaneous quench hardening, are known from the prior art. As a result of the press hardening, strengths up to 1650 MPa or more are achieved. Press-hardened shaped metal sheets are used, for example, as safety-relevant chassis parts or body components, in particular structural components (for example A and B pillars, longitudinal members, transverse members, front wall or tunnel reinforcements and the like), in order to meet the increasing requirements for safety and lightweight construction.

The prior art discloses various procedures for press hardening, such as the direct method (or direct press hardening) without pre-shaping the metal sheet and the indirect method (or indirect press hardening) with pre-shaping of the metal sheet, for which, for example, reference is made to the introductory explanations in DE 10 2011 053 939 A1.

DE 197 58 918 B4 describes a method for producing a press-hardened shaped metal sheet which also has soft zones, i.e. less hardened or non-hardened zones. Such a shaped metal sheet is also designated as a partially press-hardened shaped metal sheet. DE 10 2010 004 081 B3 also describes a method for producing a press-hardened shaped metal sheet which has at least two structural zones of different ductility. In addition, so called transition zones between zones of different ductility are mentioned. Such transition zones are also described in DE 10 2010 012 825 B4.

DE 10 2011 009 891 A1, representing the known closest prior art, describes a method for producing a press-hardened shaped metal sheet from a rolled sheet metal plate having at least two zones of different material thickness. Furthermore, provision is advantageously made for the shaped metal sheet to be produced to be only partially heat reshaped and subsequently quenched. It is also possible, by means of partial heat re-treatment, to adapt the press-hardened shaped metal sheet specifically to the desired use, again in terms of its component stiffness and its component properties.

In relation to the prior art, reference is additionally also further made to DE 10 2005 038 488 A1 and DE 10 2010 004 081 B3.

There is needed an improved press-hardened shaped metal sheet of the type mentioned at the beginning, i.e. one that can, in particular, be adapted still better to the envisaged use.

According to the invention, a press-hardened shaped metal sheet is provided having at least two adjacent zones which are formed with different sheet thicknesses or material thicknesses and with different strengths, in such a way that one of these zones is press-hardened and the other zone is non-hardened or only slightly hardened. Furthermore, a transition zone, which is simultaneously designed as a thickness transition zone and as a strength transition zone, is formed and configured between these two zones.

The invention circumvents strength jumps and sheet thickness jumps between the two adjacent zones which are formed with different strengths and sheet thicknesses, by use of a transition zone located and arranged between the same. The transition zone thus has at least one dual function, which means that the strength transition zone is substantially identical to the sheet thickness transition zone or that the sheet thickness transition zone substantially corresponds to the strength transition zone. Here, the term "substantially" means that the sheet thickness zone and the strength transition zone are intended to be congruent within the context of the production possibilities and, so to speak, to combine in a transition zone, so that none of these zones is larger or is only insignificantly larger than the other. Preferably, with the transition zone, a gradual sheet thickness transition and strength transition between the relevant adjacent zones is brought about. A shaped metal sheet according to the invention can have a plurality of transition zones configured in this way, which are each arranged and formed between adjacent zones with different strengths and sheet thicknesses.

For the production of a shaped metal sheet according to the invention, a sheet steel material (in particular manganese-alloyed and boron-alloyed steels, such as 20MnB5 or 22MnB5) suitable for press hardening is used. During the press hardening of the sheet steel material used (which, within the context of the invention, can be carried out both in accordance with the direct and in accordance with the indirect method, as explained at the beginning), although its strength is increased, conversely its ductility (which, in simplified terms, is to be understood to mean the shape change capacity) is reduced, however. It is generally true that the lower the ductility, the higher the strength achieved during press hardening. A non-hardened or only slightly hardened zone therefore has a higher ductility than a press-hardened zone. The strength and ductility in a specific zone result from the microstructure present there. A transition zone according to the invention thus also creates an, in particular, gradual ductility transition between the relevant shaped metal zones. To this extent, the transition zone can also be a structure transition zone.

The shaped metal sheet according to the invention is preferably produced from a tailored rolled blank. A tailored rolled blank is a sheet metal plate which is cut out of a rolled sheet metal material having different sheet thicknesses. The sheet metal material is produced, for example, by means of flexible rolling of a metal strip in such a way that the relevant roll spacing and therefore the roll gap defined thereby change in a defined manner during the passage of the strip, so that strip sections with different strip or sheet thicknesses result in the passage direction and over the length of the metal strip. The sheet thickness transitions are usually designed to be continuous or at least approximately continuous and extend in the manner of strips transversely with respect to the passage direction.

The practical configuration of a sheet thickness transition or sheet thickness transition zone between two adjacent plate zones with different sheet thicknesses usually determines the width of the transition zone according to the invention resulting at the corresponding point on the shaped metal sheet (or at least has an influence thereon). Formulated in other words, this can mean that the transition zone on a press-hardened shaped metal sheet according to the invention results from the corresponding sheet thickness transition zone of the sheet metal plate (used for the production), a strength transition zone having been superimposed on this sheet thickness transition zone in the sheet metal plate in a defined manner (in the sense of non-randomly) during press hardening. The transition zone of a press-hardened shaped metal sheet according to the invention can have a preferred width of 20 mm to 60 mm, and in particular of 40 mm to 50 mm. This preferably also corresponds to the width of the strip-like sheet thickness transition in the sheet metal plate or in the metal strip.

Provision is made for one of the zones connected by the transition zone according to the invention to be press-hardened. This is, in particular, the zone having the greater sheet thickness or material thickness, that is to say the thicker zone.

The press-hardened shaped metal sheet according to the invention is preferably formed without any surface coating. The press-hardened shaped metal sheet according to the invention can, however, also have a metallic anti-corrosion coating. This is preferably an aluminum/aluminum alloy coat or a zinc/zinc alloy coat. The anti-corrosion coating can already be applied to the initial sheet material which, for example, is used to produce the tailored rolled blanks. Such a previously applied protective layer can, for example, also avoid or at least reduce scaling during the press hardening.

The press-hardened shaped metal sheet according to the invention is preferably a chassis or body component for a motor vehicle. Particularly preferably, it is a safety-relevant and crash-relevant structural component for the motor vehicle body. In particular, it is a pillar reinforcement, primarily for the B pillar.

The invention also extends to a pillar reinforcement formed as a press-hardened shaped metal sheet for a motor vehicle body, in particular for the B pillar. This pillar reinforcement has a press-hardened central zone and an adjacent non-hardened or only slightly hardened bottom zone. These zones are formed with different sheet thicknesses, a transition zone being provided between these zones and, according to the preceding explanations, at the same time being configured as a thickness transition zone and as a strength transition zone. Further developments and refinements may be made in a manner analogous to the preceding explanations. The pillar reinforcement according to the invention preferably has only a single such multifunctional transition zone, which is located between the soft bottom zone and the solid or hard central zone.

In the bottom zone, specific deformation (for example bending inward) is made possible by the soft sheet material in the event of a crash. Tears and brittle fractures are prevented. Furthermore, disadvantageous effects of notch stresses are reduced.

Provision is preferably made for the press-hardened central zone of the pillar reinforcement according to the invention to have a plurality of sections or sub-zones with different sheet thicknesses, the sub-zones being formed with a substantially identical strength. The bottom zone can also have a plurality of sections and sub-zones which are formed with different sheet thicknesses and/or different strengths. In particular, the bottom zone can also be partially press-hardened.

In the bottom zone of a pillar reinforcement according to the invention, the press-hardening of the sheet material can be prevented by furnace-based measures (for example, by furnace chambers having different temperatures subdivided by shielding plates or by the use of coverings for the sheet material to be heated, both of which effect a reduction in the heating temperature) and/or by tool-based measures (for example, by means of air gaps in the appropriate tool zone or by heating devices for the partial heating of the press-hardening tool in the appropriate tool zone, both of which effect a reduction in the rate of cooling). This is done in order, as a result, to obtain a soft or at least only slightly hardened structure. The same is true of other press-hardened shaped metal sheets according to the invention. The production of soft zones by way of a partial heat treatment following the press hardening (for example subsequent annealing of the relevant previously press-hardened zone) is possible but not preferred. Provision is preferably made for the shaped metal sheets according to the invention to be substantially ready for installation following the press hardening and trimming, usually still wholly or partly to be carried out. The press hardening can be followed by cleaning, in particular in the case of uncoated but possibly also in the case of coated sheet material.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
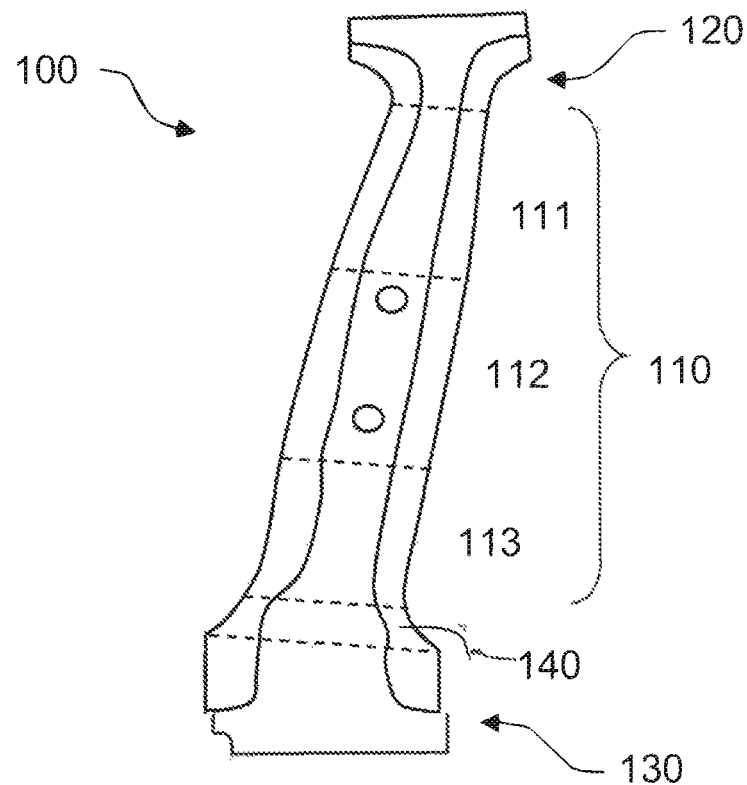
FIG. 1 is a plan view of a pillar reinforcement for a passenger motor vehicle body.

FIG. 1 shows a pillar reinforcement (inner pillar) 100 for a B pillar. The pillar reinforcement is formed as a press-hardened shaped metal sheet which has zones with different sheet thicknesses and different strengths, by which means a shape both matching the stress and matching the requirements (the requirements are different in the different zones), and also a weight-optimized configuration, is achieved. The pillar reinforcement 100 is produced from a single rolled tailored blank.

In the example shown, the pillar reinforcement 100 has a press-hardened central zone 110 in which the sheet material has a strength of, for example, at least 1300 MPa achieved by press hardening. The central zone 110 includes a plurality of substantially equally strong (i.e. formed with equal strength) sections or sub-zones with different sheet thickness. The sub-zone 111 at the top has a sheet thickness of 2.3 mm, for example. The central sub-zone 112 has a sheet thickness of 2.5 mm, for example. And, the bottom sub-zone 113 has a sheet thickness of 2.3 mm, for example. The transitions are formed as continuous transitions, i.e. without sheet thickness jumps. The pillar reinforcement 100 also has a bottom zone 130, in which the sheet material is only slightly hardened or non-hardened and is thus soft and, for example, has a strength of 450 MPa to 800 MPa. The sheet thickness in the bottom zone 130 is, for example, 1.9 mm. The pillar reinforcement 100 also has a top zone 120, in which the sheet material is likewise press-hardened, and, just like the central zone 110, has a strength of, for example, at least 1300 MPa. The sheet thickness in the top zone 120 is, for example, 1.9 mm.

The pillar reinforcement 100 is thus designed to be particularly thick and particularly strong in the central zone 110, on which particularly high strength and stiffness requirements are placed (for example because of occupant protection and because of the attachment of door hinges and door locks). In the bottom zone 130, which is provided for the attachment of the pillar reinforcement 100 to a side sill or the like, specific deformation (for example bending inward) is made possible by the less strong or softer sheet material in the event of a crash, and tears and brittle fractures are prevented.

According to the invention, between the press-hardened central zone 110 and the soft bottom zone 130, these zones also having different sheet thicknesses, there is formed a transition zone 140, which is configured not only as a thickness transition zone but also as a strength transition zone. The transition zone of the strength thus corresponds substantially to the transition zone of the sheet thickness. Along the transition zone 140, the central zone 110 or its sub-zone 113 and the bottom zone 130 are delimited with respect to each other or merge into one another in the transition zone 140.

Figure 2:
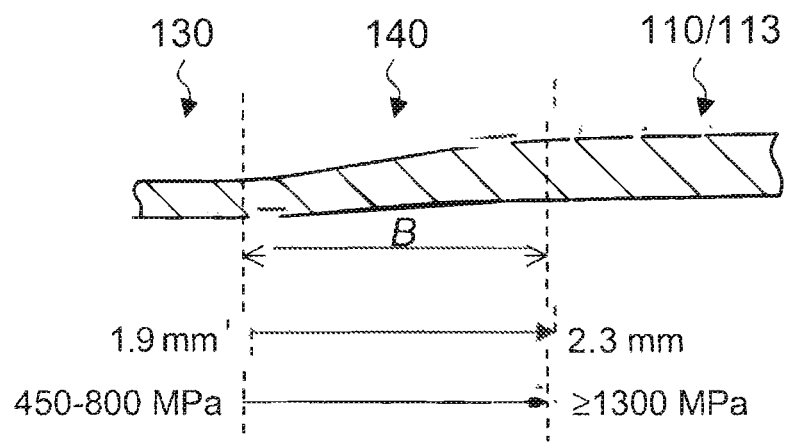
FIG. 2 is an enlarged sectional illustration showing the transition zone between the bottom zone and the central zone on the pillar reinforcement from FIG. 1.

The strip-like transition zone 140 is illustrated in FIG. 2 in an enlarged sectional illustration. Within this transition zone 140, the strength of the sheet material changes gradually from 450 MPa to 800 MPa (in the bottom zone 130) to a strength of at least 1300 MPa (in the central zone 110 or in its sub-zone 113 at the bottom) or rises appropriately. Likewise, within this transition zone 140, the sheet thickness rises gradually and thus without steps or jumps from 1.9 mm to 2.3 mm (from the bottom zone 130 to the sub-zone 113 at the bottom).

The transition zone 140 preferably has a width B of 20 mm to 60 mm and, in particular, of 40 mm to 50 mm. The transition zone 140 can also have a variable width B, which means a width that varies over the course (according to FIG. 1).

The invention offers the advantages that the properties of a press-hardened shaped metal sheet according to the invention, above all at the transition points between zones with different strengths and sheet thicknesses, are formed very precisely, and that the quality-reproducing production is possible with comparative little outlay on tool configuration and working-in.

List of designations

| Press-hardened shaped metal sheet with different sheet thicknesses and strengths | |
|---|---|
| 100 | Pillar reinforcement (shaped metal sheet) |
| 110 | Central zone |
| 111 | Sub-zone |
| 112 | Sub-zone |
| 113 | Sub-zone |
| 120 | Top zone |
| 130 | Bottom zone |
| 140 | Transition zone |
| B | Width |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A press-hardened shaped metal sheet which has different sheet thicknesses and strengths, comprising:
    at least two adjacent zones of the shaped metal sheet formed with different sheet thicknesses and with different strengths, such that one of these zones is press-hardened and the other zone is non-hardened or only slightly hardened, and
    a transition zone configured as a thickness transition zone and as a strength transition zone formed between the two adjacent zones, wherein
        at the transition zone the strength and thickness gradually changes, and
        the one of the zones that is press-hardened consist of a plurality of sections having a same strength but different thicknesses.

2. The shaped metal sheet as claimed in claim 1, wherein the shaped metal sheet is produced from a tailored rolled blank.

3. The shaped metal sheet as claimed in claim 1, wherein the transition zone has a width of 20 mm to 60 mm.

4. The shaped metal sheet as claimed in claim 3, wherein the one zone of the two adjacent zones having the greater sheet thickness is press-hardened.

5. The shaped metal sheet as claimed in claim 4, further comprising:
    a metallic anti-corrosion coating on the shaped metal sheet.

6. The shaped metal sheet as claimed in claim 1, wherein the transition zone has a width of 40 mm to 50 mm.

7. The shaped metal sheet as claimed in claim 1, wherein the one zone of the two adjacent zones having the greater sheet thickness is press-hardened.

8. The shaped metal sheet as claimed in claim 1, further comprising:
    a metallic anti-corrosion coating on the shaped metal sheet.

9. The shaped metal sheet as claimed in claim 1, wherein the transition zone involves a gradual change in the microstructure of the metal.

10. A pillar reinforcement formed as a press-hardened shaped metal sheet for a motor vehicle body, comprising:
    a press-hardened central zone and an adjacent non-hardened or only slightly hardened bottom zone, which are formed with different sheet thicknesses; and
    a transition zone configured as a thickness transition zone and as a strength transition zone, formed between the press-hardened central zone and the bottom zone, wherein
        at the transition zone the strength and thickness gradually changes, and
        the press-hardened central zone consist of a plurality of sections having a same strength but different thicknesses.

11. The pillar reinforcement as claimed in claim 10, wherein the pillar reinforcement is a B-pillar reinforcement.

12. The pillar reinforcement as claimed in claim 10, wherein the transition zone involves a gradual change in the microstructure of the metal.

13. The pillar reinforcement as claimed in claim 10, wherein the transition zone has a width of 40 mm to 50 mm.

14. The pillar reinforcement as claimed in claim 10, wherein the press-hardened central zone has a plurality of sub-zones with different sheet thicknesses, wherein these sub-zones are formed with a substantially equal strength.

15. The pillar reinforcement as claimed in claim 10, wherein the transition zone has a width of 20 mm to 60 mm.

16. The pillar reinforcement as claimed in claim 15, wherein the press-hardened central zone has a greater sheet thickness than the adjacent non-hardened or only slightly hardened bottom zone.

17. The pillar reinforcement as claimed in claim 16, further comprising a metallic anti-corrosion coating on the pillar reinforcement.

* * * * *